United States Patent [19]
Gordon

[11] 3,722,267
[45] Mar. 27, 1973

[54] HOIST-TESTING APPARATUS AND CONTROL SYSTEM THEREFOR

[75] Inventor: Richard O. Gordon, Belgium, Wis.

[73] Assignee: Harnischfeger Corporation, Milwaukee, Wis.

[22] Filed: Nov. 3, 1971

[21] Appl. No.: 195,114

[52] U.S. Cl. ............................................... 73/133 R
[51] Int. Cl. ............................................... G01l 3/00
[58] Field of Search ............. 73/133, 134, 141 A, 135

[56] References Cited

FOREIGN PATENTS OR APPLICATIONS

| 224,028 | 12/1968 | Sweden | 73/133 R |
| 198,742 | 12/1967 | U.S.S.R. | 73/134 |

Primary Examiner—Charles A. Ruehl
Attorney—James E. Nilles

[57] ABSTRACT

Apparatus for testing the rated load, speed and braking capabilities of a hoist comprises a hydraulically operated test winch which imposes a predetermined load or line pull at a predetermined speed on the hoist line. The hoist line is connected to the test winch cable by a lever and pulley arrangement. A load cell responsive to lever movement and, therefore, the load imposed, provides a visual readout thereof at an operation control station. Load size is remotely adjustable from the control station by a load control rheostat which controls an electric-hydraulic pressure control valve which, in turn, adjusts the pressure relief setting of a pressure relief valve between a hydraulic winch motor and the hydraulic pump for that motor. A load control pressure gauge at the control station is responsive to output pressure of the electric-hydraulic pressure control valve for the pressure relief valve and is calibrated to indicate pounds of line pull or load which the hoist being tested can exert to enable the operator to set the load control rheostat accordingly. Load speed is remotely adjustable from the control station by a speed control rheostat which controls another electric-hydraulic pressure control valve which, in turn, operates a cylinder to adjust the speed setting of a servo-stem speed control device on the pump. A speed control pressure gauge at the control station is responsive to output pressure of the other electric-hydraulic pressure control valve for the speed adjustment cylinder and is calibrated to indicate feet per minute of hoist line speed to enable the operator to set the speed control rheostat accordingly.

13 Claims, 4 Drawing Figures

INVENTOR.
RICHARD O. GORDON
BY James E. Nilles
ATTORNEY

INVENTOR.
RICHARD O. GORDON
BY James E. Nilles
ATTORNEY

3,722,267

HOIST-TESTING APPARATUS AND CONTROL SYSTEM THEREFOR

BACKGROUND OF THE INVENTION

1. Field of the Invention

This invention relates to hoist-testing apparatus, and, in particular, to control systems therefor.

2. Description of the Prior Art

In the manufacture of overhead hoists, for example, it is desirable to test them to determine if they meet their rated load-handling capacities and rated speeds of operation. Usually, the hoists are tested under static load, running load up, and running load down. In one part of the test, the hoist brake is set under maximum load and then a further load (150 percent of maximum) is imposed on the hoist. Heretofore, a hoist to be tested was suspended over a large pit and large, heavy steel test weights were attached to the hoist line. As many individual weights were used as was necessary to meet the load rating of the hoist under various test conditions and then the hoist was operated at its rated speed. For example, one size of hoist might be rated for a 25,000 pound line pull at 200 feet per minute and another size might be rated at a 100,000 line pull at 150 feet per minute. Furthermore, since hoist gear effiency for a particular hoist differs during hoisting or lowering, more weight was needed to test hoisting capacity than to test lowering capacity. While such testing gave satisfactory results, physically loading and unloading the test weights was difficult, dangerous and might take several hours. In some instances, therefore, not every hoist was tested, but only a small percentage out of a given production run. It is desirable, therefore, to provide improved hoist-testing apparatus and control systems therefor which overcome the aforedescribed disadvantages and have other advantages.

SUMMARY OF THE INVENTION

Hoist testing apparatus and a control system therefor in accordance with the invention is used to test a hoist having a motor, a drum and a hoist line. The apparatus comprises a test winch having a hydraulic motor, a drum driven thereby and a test cable. The apparatus further comprises a pivotable lever means and pulley means for connecting the test winch cable to the hoist line to apply a predetermined load or line pull at a predetermined speed to the hoist line.

More specifically, the test winch cable is reeved about the pulley means and the latter are connected between one end of the lever and the hoist line. A load cell connected between the other end of the lever and a fixed point is responsive to lever rotation or displacement and provide a visual readout on a gauge at an operation control station of the size of the load. The hydraulic winch motor is supplied with pressurized fluid from a hydraulic pump driven by an electric motor and having speed adjusting means thereon, such as a servo-stem speed control which is movable to vary the fluid output from the pump.

Load control means are provided to vary the load imposed on the hoist line so that a maximum load (or some percentage thereof) can be imposed on a particular hoist being tested. Such load control means take the form of a load control rheostat at the control station which controls fluid pressure from an adjustable electric hydraulic pressure control valve to regulate the pressure relief setting of a pilot operated adjustable pressure relief valve between the pump and the hydraulic winch motor. A load control pressure gauge at the control station is responsive to output pressure of the electric-hydraulic pressure control valve for the pressure relief valve and is calibrated to indicate pounds of line pull or load which the hoist being tested can exert to enable the operator to set the load control rheostat accordingly.

Speed control means are provided to vary the speed at which the winch operates so that it matches the rated speed of the hoist line. Such speed control means take the form of a speed control rheostat at the control station which controls fluid pressure from another electric-hydraulic pressure control valve which is used to control movement of a piston in a hydraulic cylinder connected to the movable servo-stem speed control on the pump. A speed control pressure gauge at the control station is responsive to output pressure of the other electric-hydraulic pressure control valve for the speed adjustment cylinder and is calibrated to indicate feet per minute of hoist line speed to enable the operator to set the speed control rheostat accordingly.

In testing a hoist rated at a particular load and speed, the operator at the control station merely adjusts the load control and speed control rheostats, so that the settings of the test winch match those of the hoist being tested. Thus, hoist-testing apparatus in accordance with the invention eliminates the need to physically attach weights to or remove them from each hoist being tested. Furthermore, the apparatus is readily adapted for use with hoists of different ratings by merely adjusting the speed and load rheostat controls to set test winch speed and load to desired values. Brake tests requiring application of 150 percent of rated load to a stationary hoist line are carried out in the same way. Also, the apparatus employs commercially available hydraulic components (such as pumps, motors, load cells, valves and the like) and is relatively economical to fabricate and use. Furthermore, necessary load and speed adjustments are easily carried out by a single operator from a remote control station.

These and other objects and advantages of the present invention will appear hereinafter as this disclosure progresses, reference being had to the accompanying drawings.

DESCRIPTION OF THE INVENTION

Figure 1:
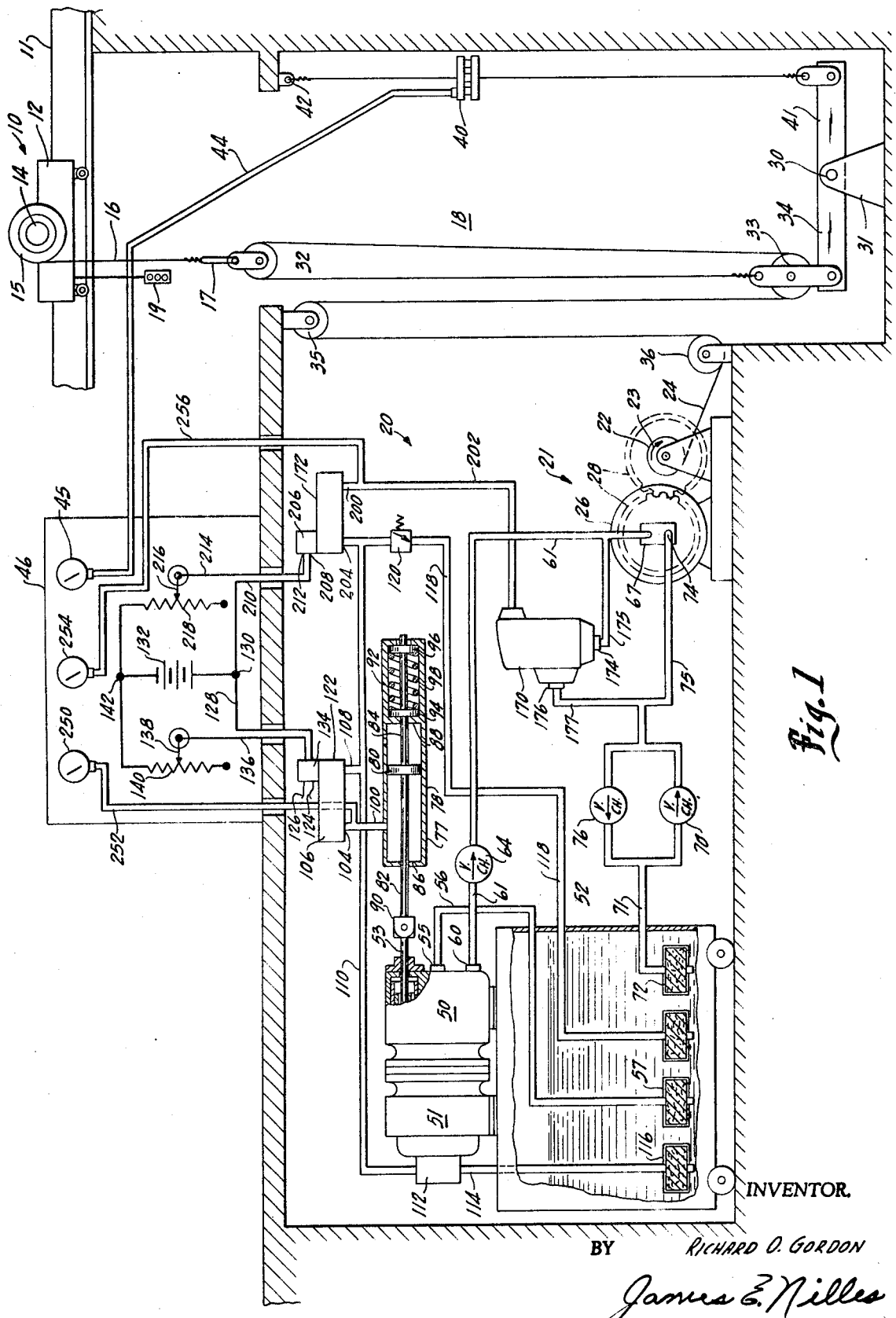
FIG. 1 is a side elevational view in schematic form of hoist-testing apparatus and a control system therefor, in accordance with the present invention.

Referring to FIG. 1 of the drawing, the numeral 10 designates an electric hoist which is to be tested and is mounted on overhead rail 11. Hoist 10 comprises a wheeled carriage 12 to adapt it for horizontal movement on rail 11 and further comprises an electric motor 14 energizable to rotate a hoist drum 15 to move a hoist line or cable 16 having a hook 17 in either direction vertically. Assume, for example, that hoist 10 is rated to handle a maximum load of (or has a line pull of) 50,000 pounds at a maximum speed of 150 feet per minute. Hoist 10 is disposed over a pit 18 in the floor of a structure in which testing is carried out. A control pendant 19 for controlling the hoisting, lowering and braking functions of hoist 10 depends from the hoist.

Hoist test apparatus 20 and a control system therefor in accordance with the invention is conveniently disposed in pit 18 for safety and space considerations and generally comprises a test winch 21 rigidly secured to the floor of the pit, means for connecting the test winch to hoist 10 to apply predetermined loads thereto at predetermined speeds, means for providing an indication of the load applied to hoist 10 by the test winch, and means for operating and controlling the load imposed by and the speed of the test winch.

Test winch 21 comprises a rotatable drum 22 (rotatable in the direction of an arrow 23 to wrap on cable) having a test cable 24 and a hydraulic motor 26 operable to drive the drum through suitable gears 28. Hydraulic motor 26, for example, is a conventional fixed volume piston-type motor rated at 3,000 p.s.i. and 13,000 ft.-lbs.

The means for connecting test winch 21 to hoist 10 comprises a lever 30, such as a steel beam, mounted for pivotal movement on a fulcrum 31 rigidly secured to the floor of pit 18. Pulley means such as a sheave 32 is removably connected to hook 17 of hoist 10. A sheave 33 is connected to one end 34 of lever 30, and sheaves 35 and 36 are securely mounted at fixed positions in pit 18. Test cable 24 of winch 21 is reeved about the sheaves 36, 35, 33 and 32 and is also attached to sheave 33. As hereinafter explained forces exerted between hoist line 16 and test cable 24 cause deflection or clockwise rotation (with respect to FIG. 1) of lever 30 and a predetermined amount of rotation corresponds to a predetermined amount of load or line pull imposed on hoist line 16.

The means for providing an indication of the load or line pull applied to hoist line 16 of hoist 10 by test winch 21 comprises a conventional hydraulic load cell 40 connected between the other end 41 of lever 30 and a fixed point 42 in pit 18. Load cell 40 is connected by a pressure line 44 to a readout device or gauge 45 on an operator's control panel 46 located outside of pit 18. Load cell 40 translates the strain to which it is subjected by clockwise pivotal movement of lever 30 into a visual readout in pounds of load or line pull on gauge 45.

The means for operating test winch 22 comprises a hydraulic pump 50, such as a constant speed variable volume piston type pump, rated for example at 3,000 p.s.i. and 45 G.P.M. and an electric motor 51 for driving the pump, such as a conventional constant-speed squirrel cage type motor rated, for example at 150 h.p. Pump 50 and electric motor 51 are shown mounted on top of a hydraulic fluid reservoir 52 in pit 18. The fluid output from pump 50 is understood to be variable to change the speed of hydraulic motor 26 of winch 21 by means of a reciprocably movable servo-stem 53 provided thereon. A pump of this type designated as a type PVC45–10 variable in-line piston pump is shown in bulletin M–2222–S of the Vickers Division of Sperry Rand, Troy, Mich.

Pump 50 is provided with a fluid intake port 55 which is connected by a hydraulic fluid suction line 56 to the fluid in reservoir 52. Line 56 is provided with a suction-type filter screen 57 for filtering fluid supplied to pump 50. Pump 50 is also provided with a fluid output or pressure port 60 which is connected by a hydraulic fluid line 61, containing a conventional check valve 64 to an inlet port 67 on hydraulic motor 26. Another port 74 of motor 26 is connected through a fluid line 75, through a conventional spring-loaded check valve 70 (rated for example to open at 3 p.s.i. pressure in line 75), and through a fluid line 71 and a filter 72 to the fluid in reservoir 52.

Another conventional spring-loaded check valve 76 (rated for example to open at 50 p.s.i. suction in line 75) is connected to parallel with (but poled opposite to) valve 70. Check valve 76 is used as a back pressure relief check valve to keep 50 p.s.i. on the return side of hydraulic motor 26 when the motor is running as a motor. This helps to eliminate pulsations of the hydraulic motor.

Figure 2:
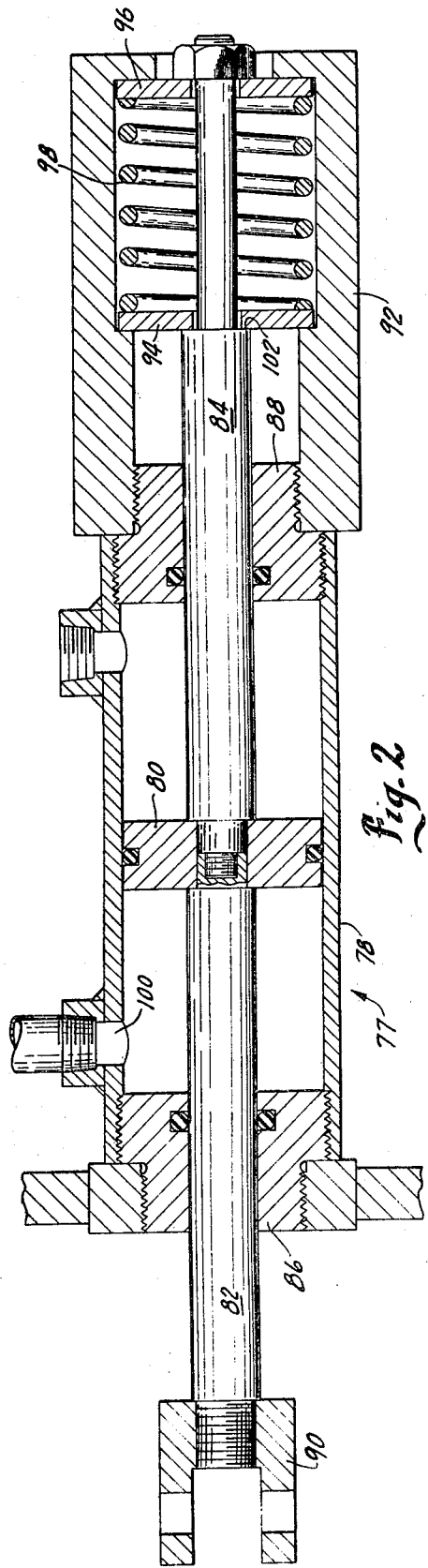
FIG. 2 is an enlarged cross-sectional view of a hydraulic actuator used to effect speed control in the hoist-testing apparatus shown in FIG. 1.

Means are provided to remotely control or regulate the speed of hydraulic motor 26 of test winch 21 and comprises a spring loaded actuator 77 for reciprocably moving servo-stem 53 on pump 50. As FIGS. 1 and 2 show, actuator 77 comprises a cylinder 78 having a piston 80 which is provided with a pair of rods 82 and 84 extending from the ends 86 and 88, respectively, of the cylinder. Rod 82 has a yoke 90 which is connected to servo-stem 53 of pump 50. Rod 84 extends into a spring housing 92 at the end 88 of cylinder 78 in which a pair of movable washers 94 and 96 and a centering spring 98 are also disposed. In FIGS. 1 and 2, piston 80 and its associated rods 82 and 84 are shown in spring-centered position wherein servo-stem 53 is maintained in the zero-speed position and no fluid pressure is provided from port 60 of pump 50 to hydraulic motor 26. In operation, as fluid pressure at port 100 in cylinder 78 increases, it causes rightward movement (with respect to FIGS. 1 and 2) of piston 80 and the rods 82 and 84. As this occurs, a shoulder 102 on rod 84 bears against washer 94, thereby causing compression of spring 98. When fluid pressure at port 100 decreases, spring 98 re-expands against washer 94 and moves rod 84 and piston 80 back to their spring-centered positions shown in FIGS. 1 and 2. Actuator 77 is designed, for example, so that 100 p.s.i. of fluid pressure is required to overcome the bias of spring 98 and initiate movement of piston 80 and an additional 100 p.s.i. of fluid pressure is required for each quarter inch of rightward travel of the piston.

Figure 4:
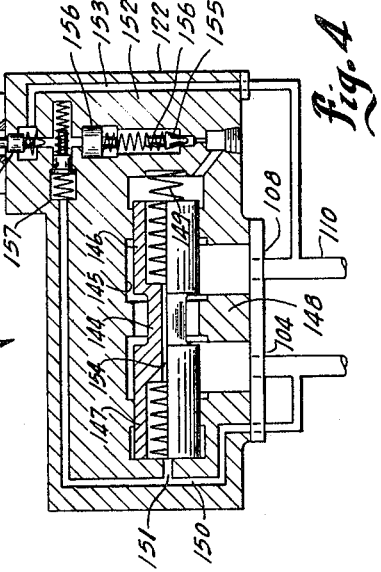
FIG. 4 is an enlarged, cross-sectional view of an electrohydraulic pressure control valve used to effect operation of the actuator shown in FIG. 2 and the valve shown in FIG. 3.

Referring to FIG. 1, fluid enters and leaves cylinder 78 of actuator 77 through port 100 which is connected to a port 104 of a remotely controlled, electrically operated pressure control valve 106 of a known type which is shown in detail in FIG. 4. A fluid inlet port 108 of valve 106 is connected by a hydraulic fluid line 110 to receive the fluid output of a constant volume, pressure compensated (constant pressure) pump 112 which is mounted on and driven by electric motor 51. Pump 112 is supplied from reservoir 52 through a fluid line 114 having a filter 116. Fluid port 108 of control valve 106 is connected by a fluid return line 118 having a pressure relief valve 120 therein to reservoir 52. Pressure control valve 106 comprises a valve body 122 on which a D.C. solenoid operating coil 124 is mounted. As FIG. 1 shows, one terminal 126 of coil 124 is electrically connected by an electrical conductor 128 to a terminal 130 of a D.C. power supply 132. The other terminal 134 of coil 124 is electrically connected by an electrical conductor 136 to the wiper 138 of a manually controlled potentiometer or rheostat 140 on control panel 46. One end of the resistance element of potentiometer 140 is electrically connected to the other terminal 142 of D.C. power supply 132.

As FIG. 4 shows, control valve 106 comprises a spool valve having a valve spool 144 movable in a valve chamber 145 in valve body 122. Spool 144 includes spaced collars 146 and 147 which cooperate with a flange 148 to control the flow of fluid in and out of the inlet and outlet ports 104 and 108 which communicate with chamber 145. A variable orifice is formed by flange 148 and the collars 146 and 147 and the size of the orifice is altered by the positioning of valve spool 144 with respect to the flange. The position of valve spool 144 is regulated by pilot pressure control means. Spool 144 is biased into the leftward position shown in FIG. 4 (i.e. open position) by a spring 149. The pilot pressure control means acts against the bias of spring 149 to control valve spool position. A pilot fluid line 150 in valve body 122 includes a control port 151 by which fluid pressure is applied to the valve spool. This pressure tends to move valve spool 144 to the right against the force of spring 149.

The pressure exerted on valve spool 144 by the fluid in control port 151 is controlled by coil 124. A poppet valve 152 is interposed between control port 151 and a drain 153. A fluid passage 154 in valve spool 144 connects control port 151 to poppet valve 152. Poppet valve 152 includes a poppet 155, a bias spring 156a, and a piston 156. Poppet 155 regulates the flow of fluid between control port 151 and drain 153 and thus, the pressure exerted on valve spool 144.

The position of poppet 155 is controlled by a relief valve 157 interposed in fluid line 150 between control port 151 and drain 153. The poppet 158 of relief valve 157 is connected to the plunger 159 of solenoid coil 124. Relief valve 157 controls the fluid pressure applied to piston 156 in accordance with its relief action which in turn controls the position of poppet 155, the flow of fluid between control port 151 and drain 153, the pressure exerted on valve spool 144 and, therefore, the position of the latter.

A speed control pressure gauge 250 is provided at control station 46 and is connected by a fluid line 252 to fluid pressure port 104 of pressure control valve 106. Gauge 250 is responsive to the fluid output pressure of pressure control valve 106 and is calibrated to indicate feet per minute of hoist line speed. Gauge 250 enables the operator to set speed control rheostat 140 at settings which establish predetermined line speeds for hoist line 16. A predetermined pressure at pressure port 104 of control valve 106 establishes a predetermined position for piston 80 of actuator 77 and servostem 53 and thus, effects a predetermined speed of operation of winch motor 26.

Means are provided to remotely control, regulate, or limit the load exerted on hoist 10 by hydraulic motor 26 of test winch 21 and comprises a conventional pilot operated, remotely adjustable pressure relief valve 170. Relief valve 170 is remotely adjustable to regulate its pressure relief setting to limit fluid flow to motor 26 by means of a remotely controlled, electrically operated pressure control valve 172, identical in construction and operation to pressure control valve 106 hereinbefore described. Relief valve 170 has an inlet port 174 which is connected to fluid line 61 through a fluid line 175. Relief valve 170 also has a normally closed pressure relief port 176 which is connected through a hydraulic fluid line 177, through check valve 70, and through fluid line 71 and filter 72 to reservoir 52.

Figure 3:
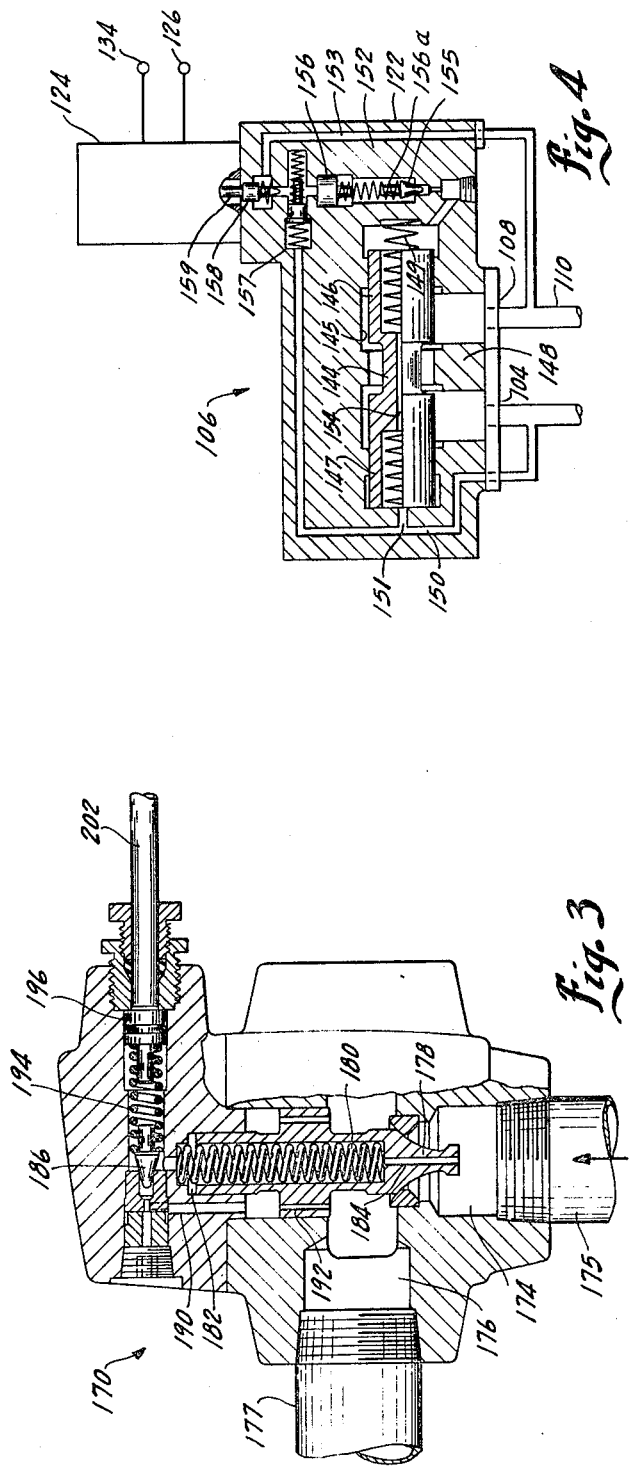
FIG. 3 is an enlarged, cross-sectional view of an adjustable pressure relief valve used to effect load control in the hoist-testing apparatus shown in FIG. 1.

As FIG. 3 shows, the pressure relief port 176 of valve 170 is normally closed off from communication with inlet port 174 by a movable spool 178 which is biased to closed position by a compression spring 180 in the housing of valve 170 and by fluid pressure in a chamber 182 behind spool 178. Chamber 182 is connected to inlet port 174 through a fluid passageway 184 in spool 178 and the fluid therein is normally at the same pressure as the fluid at port 174. When fluid pressure in chamber 182 reaches a predetermined level, a normally closed poppet valve 186 is forced open against the bias of a spring 188 to allow communication between chamber 182 and outlet port 176 through a passageway 190 in the valve housing and a passageway 192 in spool 178. Poppet valve 186 is biased closed by the force of a spring 194 which is acted upon by a movable plunger or piston 196. The amount of mechanical pressure exerted by plunger 196 against spring 194 determines the pressure level at which poppet 186 unseats, and therefore, the pressure level at which spool 178 moves to open position. The force on plunger 196, in turn, is a function of the fluid pressure exerted thereagainst from an outlet port 200 of pressure control valve 172 through a fluid line 202. A fluid inlet port 204 of control valve 172 is connected to fluid line 110 to receive pressurized fluid from pump 112. A solenoid operating coil 206 of valve 172 has one terminal 208 electrically connected by an electrical conductor 210 to terminal 130 of power supply 132. The other terminal 212 of coil 206 is electrically connected by an electrical conductor 214 to the wiper 216 of a manually controlled potentiometer or rheostat 218 on control panel 46. The resistance element of potentiometer 218 is electrically connected to the other terminal 142 of power supply 132.

A load control pressure gauge 254 is provided at control station 46 and is connected by a fluid line 256 to fluid pressure port 200 of pressure control valve 172. Gauge 254 is responsive to the fluid output pressure of pressure control valve 172 and is calibrated to indicate pounds of line pull or load which hoist line 16 can exert. Gauge 254 enables the operator to set load control rheostat 218 at settings which establish predetermined loads for hoist line 16. A predetermined pressure at pressure port 200 of control valve 172 establishes a predetermined pressure at which pressure relief valve 170 will open.

Operation of the invention is as follows. Assume that hoist 10, connected as shown in FIG. 1 is to be tested and that it is rated, for example, to have a maximum load or line pull of 25,000 pounds at 200 feet per minute. In carrying out all tests, as hereinafter described, assume that electric motor 51 and pump 50 are in operation. Also assume that the operator at control station 46 is able to control the raising, lowering and braking function of hoist 10 by means of control pendant 19. Further assume that speed control means and load control means have been set (or are adjusted during the tests) by the operator by means of the rheostats 140 and 218, respectively, on panel 46 for the specified rating of hoist 10. Finally, assume that hoist 10 is to undergo four tests as follows:

Test 1. Hoist is braked so that its drum is stationary and maximum rated load is to be imposed thereon.

Test 2. Hoist is braked so that its drum is stationary and 150 percent of maximum rated load is to be imposed thereon.

Test 3. Hoist operating in the hoist direction and maximum rated load is to be imposed thereon.

Test 4. Hoist operating in the lower direction and maximum rated load is to be imposed thereon.

During Test No. 1, which is a static load test, hydraulic motor 26 is supplied with fluid from port 60 of pump 50 through line 61, check valve 64, and port 67. Therefore, motor 26 operates as a motor and rotates (or tends to rotate) winch drum 22 in the direction of arrow 23 so that test cable 24, acting through the pulleys and lever 30 exerts a downward pulling force or strain on hoist line 16 (which remains stationary because it is braked). The force increases until it equals the rated load of hoist 10, at which point pressure relief valve 170 opens to prevent motor 26 from exerting any greater force. However, motor 26 continues to maintain this degree of force on hoist line 16. Simultaneously, lever 30 is deflected or pivoted very slightly in the clockwise direction (with respect to FIG. 1) thereby imposing a strain on load cell 40 equal (or proportional) to that imposed on hoist line 16 and this is registered on gauge 45 on panel 46 in pounds of load or line pull.

During Test No. 2, which is also a static load test, assume that conditions are the same as in Test No. 1 (i.e., the hoist brake is set and hoist line 16 is stationary) but it is desired to impose 150 percent of rated load on hoist 10 to test the hoist brakes. Normally, the hoist brake is set under maximum rated load conditions and then checked at 150 percent of this value. To accomplish this, the operator at control panel 46 adjusts load control 218 to increase the pressure setting for pressure relief valve 170 to the desired pressure, i.e., 150 percent of rated load. Thus, hydraulic motor 26 is able to operate as a motor and exert this greater degree of strain on hoist line 16 before pressure relief valve 170 opens. Thus test No. 2 may be carried out subsequent to test No. 1 merely making one control adjustment.

During Test No. 3, which is a running load test, hoist 10 is operating in the hoist direction and hoist line 16 is ascending at rated speed. Consequently, test cable 24 is unwrapping from test winch drum 22 and to accomplish this, drum 22 must rotate in a direction opposite to arrow 23. Under this condition, hydraulic motor 26 runs in reverse or acts as a pump but it is pumping against pressurized fluid being supplied from pump 50 to motor port 67. Therefore, this resistive force acts to maintain the maximum load on hoist cable 16. If operation of motor 26 as a pump reaches the point where it requires more fluid, such is available from reservoir 52 through filter 72, line 71, check valve 70, line 75 and port 74 of motor 26. During test No. 3, lever 30 is deflected or pivoted clockwise (with respect to the drawing) in response to the pulling action of hoist 10 and load cell 40 senses this to provide a readout on gauge 45.

During test No. 4, which is a running load test, hoist 10 is operating in the lowering direction and hoist line 16 is descending at rated speed. Consequently, test cable 24 is wrapped on test winch drum 22 as the latter is rotated in the direction of arrow 23. Under these conditions, hydraulic motor 26 runs as a motor but must run at sufficient speed and with sufficient torque to keep up with the speed of hoist 10 and still impose maximum load thereon. In the course of test No. 4, then, test cable 24 still causes clockwise deflection or pivoting (with respect to the drawing) of lever 30 and load cell 40 provides an appropriate reading on gauge 45.

In regard to tests Nos. 3 and 4, it should be noted that the running line pull of electric hoist 10 going up is different from the running line pull going down. This is due to the fact that its planetary gears run at a different efficiency going up than when going down. Old test methods used weights and more weights would be used going up and less weights going down. In accordance with the invention, the operator can set the proper load going up and doing down with load potentiometer 218. Correct load is sensed by load cell 40 and shown at gauge 45.

It is to be understood that, if a hoist to be tested exceeds the load-handling capacity of hydraulic motor 26 and pump 50 shown, additional motors and pumps could readily be connected in parallel therewith to increase the capacity of test apparatus 20.

Furthermore, test apparatus in accordance with this invention need not be confined to a pit as shown, but could be installed or applied in other ways.

Finally, the pulley means associated with lever 30 could take other forms, depending on the mechanical advantage desired, and load cell 40 could be connected to lever 30 in some other manner, provided it gives an appropriate load indication.

I claim:

1. Apparatus for testing a hoist having a hoist line and rated to have a predetermined line pull and predetermined line speed comprising;
    a test winch,
    connecting means for connecting the hoist line to said test winch, said connecting means including a member movable in proportion to the amount of line pull or load imposed on said hoist by said test winch,
    sensing means responsive to the movement of said member and providing an indication of the size of load being imposed,
    load control means for controlling the size of the load imposed by said test winch on said hoist, and
    speed control means for controlling the speed of said test winch so that it is related to hoist line speed.

2. Apparatus according to claim 1 wherein said test winch comprises a hydraulic motor driven by a hydraulic pump, wherein said load control means controls said motor, and wherein said speed control means controls said pump.

3. Apparatus according to claim 2 wherein said load control means comprises a pressure relief valve connected between said pump and said motor and wherein said speed control means comprises speed adjustment means on said pump.

4. Apparatus according to claim 3 wherein said sensing means provides an indication of load size at a control station and wherein said pressure relief valve and said speed adjustment means are remotely adjustable from said control station.

5. Apparatus according to claim 4 including a hydraulic fluid reservoir for supplying said pump, a hydraulic fluid line connected between said reservoir and said motor and between said reservoir and said relief valve, and first and second check valves in parallel but in opposite relationship with each other in said line, said first check valve permitting fluid flow to said motor when the latter is acting as a pump, said second check valve permitting fluid flow to said reservoir from said relief valve when said relief valve exceeds its pressure setting.

6. Apparatus according to claim 5 wherein said sensing means comprises a load cell connected to said movable member.

7. Apparatus according to claim 6 wherein said test winch comprises a test cable, wherein said connecting means comprises a lever as said movable member and wherein said connecting means further comprises pulley means connected to said lever, said hoist line and said test cable being connected to said pulley means.

8. Apparatus according to claim 7 wherein said pulley means are connected to said lever on one side of said fulcrum and said sensing means comprises a load cell which is connected to said lever on the other side of said fulcrum.

9. Apparatus according to claim 4 wherein said load control means comprises a first electric-hydraulic pressure control valve remotely operable from said control station to adjust said pressure relief valve, and wherein said speed control means comprises a second electric-hydraulic pressure control valve remotely operable from said control station and a hydraulic actuator controlled thereby to adjust said speed adjustment means on said pump.

10. Apparatus according to claim 9 wherein said first and second electric-hydraulic pressure control valves are remotely operable by rheostats at said control station.

11. Apparatus according to claim 9 wherein said load control means comprises load indicator means at said control station responsive to fluid pressure supplied by said first electric-hydraulic pressure control valve to said pressure relief valve to indicate a load setting for said hoist, and wherein said speed control means comprises speed indicator means at said control station responsive to fluid pressure supplied by said second electric-hydraulic pressure control valve to said actuator to indicate a speed setting for said hoist.

12. Apparatus according to claim 11 wherein said load indicator means provides a readout in pounds and wherein said speed indicator means provides a readout in feet per minute.

13. Apparatus according to claim 10 wherein said rheostats establish pressure levels at the pressure ports of said pressure control valves.

* * * * *